Patented Nov. 30, 1948

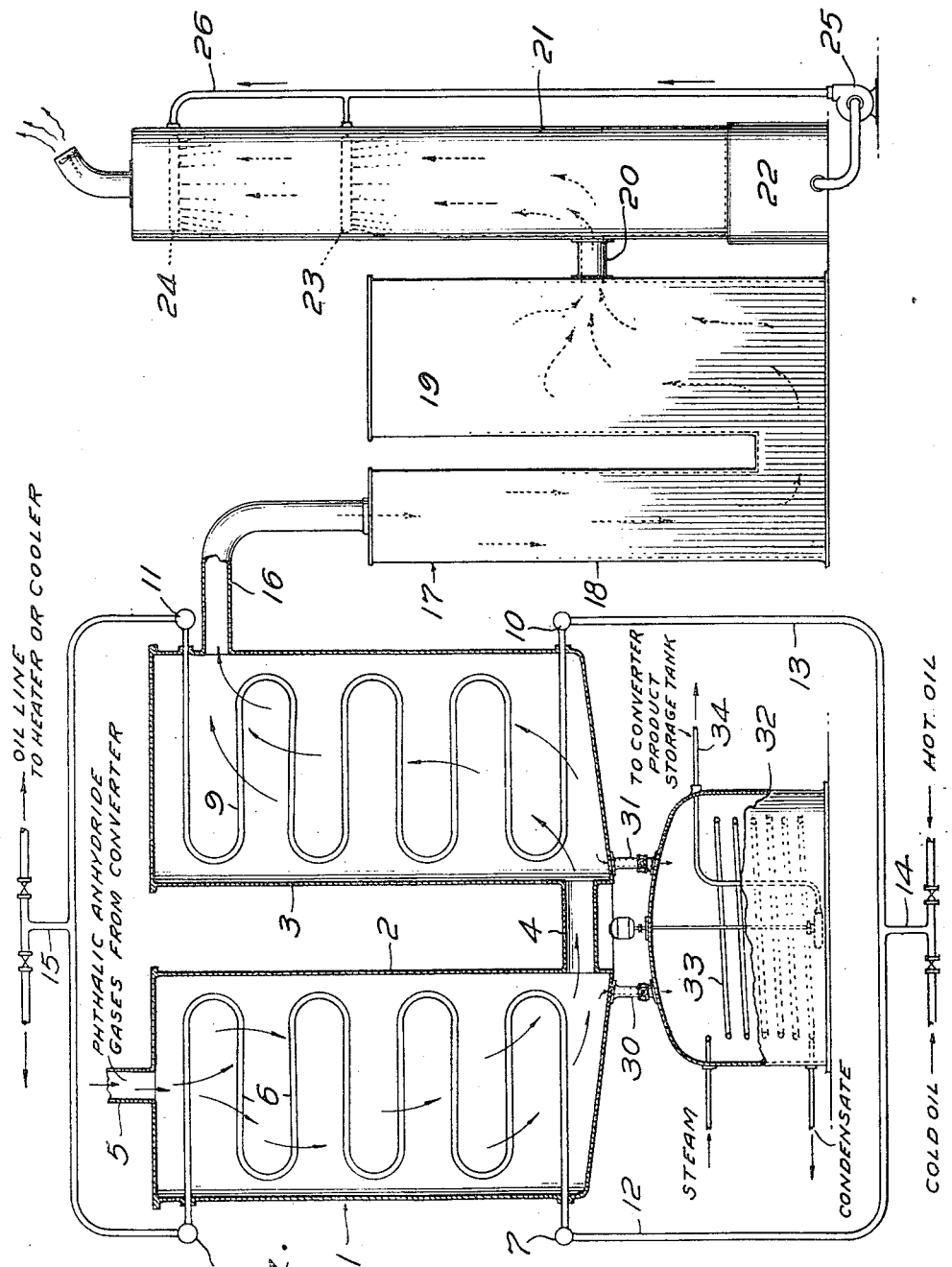

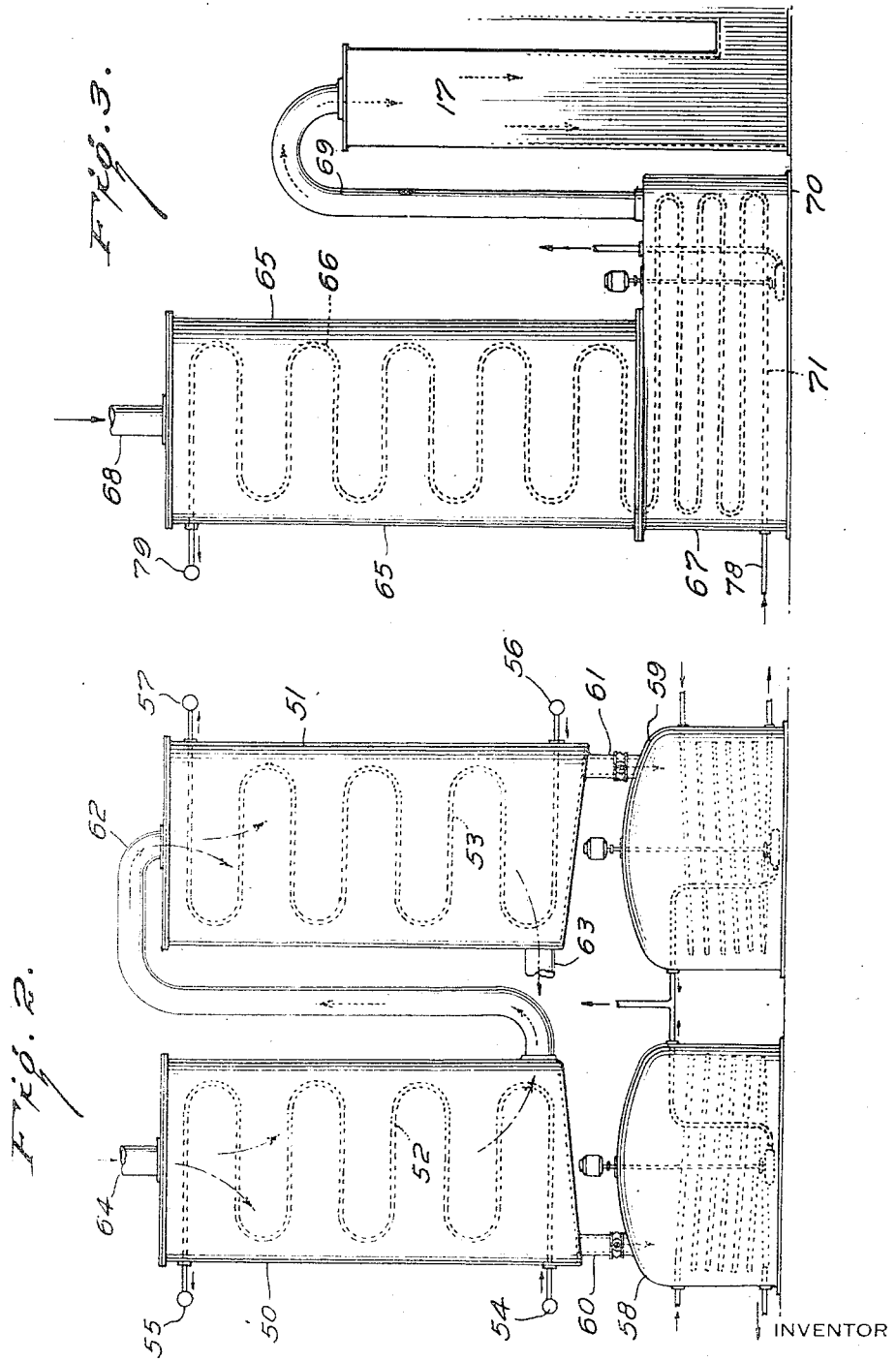

2,455,314

UNITED STATES PATENT OFFICE 2,455,314

FRACTIONAL CONDENSATION OF PHTHALIC ANHYDRIDE

Kurt F. Pietzsch, Pittsburgh, Pa., assignor to American Cyanamid Company, New York, N. Y., a corporation of Maine Application August 21, 1945, Serial No. 611,891

4 Claims. (Cl. 260—342.5)

This invention relates to a method and apparatus for the recovery by fractional condensation of anhydrides of organic carboxylic acids from gases produced by the vapor phase oxidation of organic compounds. The principles of the invention are applicable to a wide variety of organic carboxylic acids and anhydrides thereof obtainable in the form of gaseous converter products. Thus, for example, they may be used for the recovery of maleic anhydride from the catalytic vapor phase oxidation of benzene, toluene, butadiene, butanol and other carbon compounds containing or forming under the conditions of reaction a system of conjugated double bonds. The invention may also be applied to the recovery of naphthalic anhydride from gas mixtures obtained by the catalytic air oxidation of acenaphthene. Apparatus constructed and operated in accordance with the principles of the invention can also be employed for the fractional condensation of other oxidation products, such as for the separation of anthraquinone obtained by the catalytic air oxidation of anthracene, including particularly the oxidation of impure anthracene containing phenanthrene and carbazole as impurities. However the most important field of utility of the invention is the recovery of a purified phthalic anhydride from vapors thereof containing other oxidation products such as alphanaphthoquinone and particularly maleic anhydride. Such vapors are obtained by the catalytic air oxidation of aromatic hydrocarbons such as naphthalene, ortho-xylene and the like. The invention includes novel methods for the fractional condensation of organic carboxylic acid anhydrides such as phthalic anhydride, novel apparatus for carrying out these methods, and an improved procedure for recovering the condensed carboxylic acid anhydrides from the condensing apparatus.

Although the broad principles of the invention can be applied to the recovery of a wide variety of organic carboxylic acids in the form of their anhydrides certain specific advantages are obtained in the recovery of phthalic anhydride, and therefore the invention will be described in greater detail with reference to this material. Phthalic anhydride is now produced in large quantities by the catalytic air oxidation of naphthalene or other aromatic hydrocarbons, the vapors of which are mixed with air or other oxidizing gas and passed over or through a catalyst containing vanadium or molybdenum such, for example, as a catalyst containing silver and vanadium coated on a suitable carrier. The reaction is highly exothermic and therefore the catalyst is usually retained in tubes surrounded by an efficient cooling medium, such as a boiling or non-boiling bath of good heat conductivity. Catalyst temperatures ranging from about 350° C. to about 550° C. are usually employed.

When the catalytic air oxidation of naphthalene is carried out in the above-described manner the gases issuing from the converters contain vapors of phthalic anhydride in admixture with appreciable quantities of maleic anhydride, smaller quantities of alphanaphthaquinone and other impurities and large amounts of carbon dioxide, nitrogen and oxygen. These gases are partially cooled and passed through fractional condensers to separate out the phthalic anhydride after which they are run into fume towers where they are sprayed with water or other aqueous liquid to recover the maleic anhydride in the form of maleic acid.

Various types of atmospheric condensers have been employed for fractional condensation of the phthalic anhydride, of which those in the form of vertical cylinders are usually most convenient. This shape is preferable because it permits the operation of continuous rotary scrapers to remove phthalic anhydride crystals from the condenser walls. However, in spite of the continuous operation of powerful scrapers, a dense crust is rapidly formed on the walls of atmospheric condensers, requiring manual cleaning of the condensers several times a month. Such manual cleaning is an extremely objectionable job, since workmen must enter and work in a closed chamber filled with highly irritating fumes and phthalic anhydride dust, and experience has shown that the cost of labor for this job is very high.

In addition to the high cost of maintaining the atmospheric type of condensers in a clean, usable condition a number of series operating difficulties have been encountered. Ordinarily three such condensers are used in series of which the first produces a high-grade phthalic anhydride; however, the yield from this condenser is relatively small, being about 30–40% of the total condensed phthalic anhydride when the condenser is freshly cleaned and decreasing as the insulating cake of phthalic anhydride builds up on the condenser walls. The second condenser produces a somewhat more contaminated phthalic anhydride, while the product from the third condenser is quite impure. Operation of the condensers varies considerably with seasonal temperature changes; thus the carryover of uncondensed phthalic anhydride to the fume towers is worse in summer, while in cold winter weather the contamination of the condensed phthalic anhydride with maleic anhydride and other impurities is considerably greater. This difficulty is discussed in detail in U. S. Patent No. 2,220,044 wherein the degree of maleic acid contamination of products from the different condensers during summer and winter weather is shown.

Although the above deficiencies in the fractional condensation of phthalic anhydride by atmospheric condensers are well-known and are matters of long standing, no satisfactory substitute has heretofore been proposed. Numerous suggestions for the use of water cooling or other positive, controllable means of condensation have always encountered the difficulty that the formation of a crust or cake of condensate on the condensing surfaces would quickly interfere with the heat exchange, and would soon clog up the apparatus. These considerations have heretofore deterred the installation of positively cooled condensing apparatus for the fractional condensation of phthalic anhydride and other organic carboxylic acid anhydrides from vapor phase oxidation processes.

The present invention is based on the discovery of a condensing method whereby the problem of crust formation is avoided and the use of positively cooled condensing elements in fractional condensers for phthalic anhydrides and other carboxylic acid anhydrides is made possible. This discovery relates to the manner and form in which phthalic anhydride and other organic carboxylic acid anhydrides condense from gases containing them. Investigation has shown that these compounds condense from the gaseous phase initially in the form of extremely finely divided flakes or particles in a semi-plastic or almost-liquid condition. The condenser is filled with these fine particles, resembling snowflakes in appearance, which coalesce to form the needle crystals which are the normal crystal form of phthalic anhydride. The mechanism of the phthalic anhydride condensation therefore involves the rapid formation of a finely divided semi-plastic form of phthalic anhydride which in turn more slowly forms the needle crystal variety.

I have found that, contrary to what would ordinarily be expected, the finely divided organic carboxylic acid anhydrides do not adhere to cooling elements in a closed condensing chamber in their first or semi-plastic condition. Whether this is due to their light, fluffy form, resembling snowflakes or small feathers, or to some other condition existing in the condensing chamber, I have not as yet definitely determined. I have found, however, that the passage of gases containing vapors of phthalic anhydride and other organic carboxylic acid anhydrides through a condensing chamber provided with positively cooled temperature regulating elements will result in the formation of a loose mass of needle crystals in the spaces between the cooling elements with little or no building up of a cake or crust on the cooling elements themselves. This discovery has enabled me to provide more accurate temperature control and better recoveries of purified product in the fractional condensation of phthalic anhydride and other carboxylic acid anhydrides, and therefore constitutes the most important feature of the present invention.

Other advantages are also obtained in the operation of positively cooled condensers in accordance with the principles of my invention. The mass of needle crystals which forms around and between the cooling elements of the condenser forms, in effect a filter which enhances the removal of the flocculent form of phthalic anhydride or other carboxylic acid anhydrides from the gas stream, and thus avoids mechanical entrainment, but does not impede the flow of gases therethrough. This in turn results in a much cleaner gas effluent from the condensers and therefore in greatly improved fume tower operations, the advantages of which will subsequently be described.

From the foregoing it will be seen that one principal object of my invention is the provision of a method and apparatus for the fractional condensation of phthalic anhydride or, if desired, of other carboxylic acid anhydrides by the use of positively cooled condensers. A further object resides in an improved method of removing the condensed material from the condensing apparatus by heating it to temperatures above its melting point and removing it as a liquid. This second object can be accomplished easily and rapidly by passing a heating medium such as steam or preferably hot oil through the same elements that were used for cooling purposes during the condensing cycle.

In practicing the process of my invention the apparatus is operated alternately in an on-stream and off-stream cycle wherein, during the on-stream operation, phthalic anhydride is condensed from the gases to form a mass of needle crystals in the condenser. During the off-stream period the condensed phthalic anhydride is melted from the apparatus by the application of a heating medium, preferably in the form of hot oil passed through the temperature regulating elements in the condenser, and is recovered in the form of a molten product.

The invention will be illustrated in greater detail by reference to the attached drawings wherein Fig. 1 illustrates diagrammatically one form of a positively cooled condenser constructed in the form of communicating chambers, with pipes leading to a receiver for molten phthalic anhydride, together with a box or clean-up condenser and a fume tower; Fig. 2 is a similar illustration of a modified form of apparatus in which two separate condensing chambers are used; and Fig. 3 shows a still further embodiment in which the condensing chamber and molten phthalic anhydride receiver are combined. It will be understood that although only a single unit has been shown in each of the three modifications, several such condensers are usually employed in parallel to provide continuous operation of the converters during the alternate condensing and melting cycles.

Referring to Fig. 1 of the drawings reference numeral 1 indicates generally a positively cooled condenser shown in vertical section, which in this modification is constructed in the form of two rectangular condensing chambers 2 and 3 connected by a pipe 4. The first chamber 2 is provided with a gas inlet pipe 5 for phthalic anhydride gases, which are admitted from the converter at a temperature of about 135° C. One or more sets of positively cooled condensing elements 6 in the chamber 2 are connected at opposite ends to inlet and outlet headers 7 and 8 for the recirculation of oil at an inlet temperature of 50–60° C. The second condensing chamber 3 is equipped with a similar condensing coil 9, connected at either end to inlet and outlet headers 10 and 11, the cooling elements 6 and being so arranged that a relatively uniform cooling is obtained throughout the chambers 2 and 3, respectively. Inlet headers 7 and 10 are connected as by pipes 12 and 13 to a common pipe 14 for the admission of the temperature regulating medium while the outlet headers 8 and 11 are similarly connected to an outlet line 15. The temperature of the gases in outlet pipe 16 is about 80–90° C. This pipe, which is preferably jacketed or insulated, leads to a clean-up or box condenser 17 consisting of two chambers 18 and 19, the second of which connects by means of a pipe 20 with a fume tower 21. This tower is made of or lined with acid-resistant material and is provided with sprays 23 and 24 which are supplied with water or aqueous maleic acid solution that is recirculated from a basin 22 by means of a recirculating pump 25 and pipe 26. The construction and operation of this type of fume tower is described in U. S. Patent No. 2,098,047 and further description is therefore unnecessary.

When the chambers 2 and 3 are substantially filled with condensed phthalic anhydride the flow of converter gases is shut off from the inlet pipe 5 and switched to another condenser and the cooling agent in the coils 6 and 9 is replaced by a heating agent having a temperature sufficiently high to melt the phthalic anhydride. Usually a series of these condensers is operated in parallel with connections to supply lines of hot oil and of cold oil, so that any one or more condensers can easily be switched from condensation to melting merely by shutting off the flow of one type of oil and admitting the other type. The cold oil is usually admitted at a temperature of about 50–60° C., while hot oil of any suitable temperature above 132° C. (the melting point of phthalic anhydride) may be employed. Oil at 150–160° C. has given good results in commercial practice. The phthalic anhydride melted in this manner flows through pipes 30 and 31 into a connecting tank 32 which is preferably equipped with a steam-heated coil 33 to keep it in a molten condition so that it can be pumped out through an outlet line 34.

In the modification of Fig. 2 the two condensers are so connected that the phthalic anhydride gases pass downwardly in each, thus improving the filtering action of the crystals of condensed phthalic anhydride and aiding in the removal of finely divided material. The two condensing chambers 50 and 51 are provided with the condensing elements 52 and 53, preferably in the form of pipe coils so arranged as to obtain a relatively uniform cooling throughout each of the chambers. Inlet and outlet headers 54 and 55 are provided for the admission of hot oil or cold oil to the coil 52, while similar inlet and outlet headers 56 and 57 are connected to the coil 53. By providing separate headers it is possible to maintain different temperature conditions in the condensing chambers 50 and 51 thereby improving materially the flexibility of operation. Thus, for example, oil having a temperature of 60–100° C. may be supplied to the inlet header 54 while colder oil at, for example, 50–55° C. is supplied to the header 56, whereby a pure phthalic anhydride can be recovered in the chamber 50 while a smaller yield of less pure condensate is recovered in the chamber 51. Separate storage tanks 58 and 59 are preferably provided for the two condensers, and are connected thereto by pipes 60 and 61, so that the condensates recovered during the melting cycle can be stored separately. Hot gases from the converter are admitted to the condenser 50 through inlet pipe 64 and leave through a gas exit pipe which leads to the inlet 62 of the second condenser 51. From the outlet pipe 63 of this condenser they are passed to a fume tower similar to that shown in Fig. 1 of the drawings, preferably by way of a box condenser which serves as a trap to exclude moisture from the fume tower.

In the modification of Fig. 3 a single condensing chamber 65 provided with temperature regulating elements in the form of one or more pipe coils 66 is mounted directly on a storage tank 67, which provides additional condensing capacity. In this embodiment of the invention the phthalic anhydride-containing gases entering through the inlet pipe 68 at about 133–137° C. are passed through the storage tank 67 after they traverse the condenser 65, the gas outlet pipe 69 being located on an extension 70 of the storage tank itself. Pipe coils 71, located in the storage tank 67, are connected with the coils 66 of the condenser, and therefore function as temperature regulating or condensing elements for maintaining the proper condensing temperatures in the tank 67 during on-stream operation of the condenser. During the off-stream period when the condensed product is being melted these same coils serve to maintain the product in molten condition while the heating medium admitted through inlet pipe 78 is being carried up through the coils 66 to the outlet header 79. By this arrangement the operating capacity of the apparatus is materially increased.

The operation of the above-described apparatus is evident from the construction thereof. During the on-stream period a gas mixture containing phthalic anhydride is passed through the condensing chamber in contact with the temperature regulating elements therein, which maintain suitable condensation temperatures throughout the chamber. This results in the formation of a mass of phthalic anhydride needle crystals in the condensing chamber substantially free from contamination by impurities such as maleic anhydride and alphanaphthaquinone without deposition on the temperature regulating elements themselves. The remaining uncondensed gases are preferably led from the condensing chamber to a fume tower where they are washed with water to recover their maleic anhydride content in the form of maleic acid. In this manner phthalic anhydride of good purity is obtained which can be used for many purposes without further purification, such as for the preparation of dimethyl phthalate or other esters.

In addition to the advantage discussed above, operation in accordance with the present invention results in a great increase in the purity of the maleic acid solution that is formed in the fume towers. Clear maleic acid solutions containing practically no phthalic acid have been obtained from the fume towers of a unit equipped with positively cooled condensing elements in accordance with the invention, even under the most adverse weather conditions. Maleic acid of satisfactory quality for use in the production of fumaric acid can easily be recovered from these solutions. The increased purity of the fume tower liquors is due to the fact that substantially all of the phthalic anhydride is removed from the gases by the condensers; in normal operation about 98–99% of the phthalic anhydride produced by the converter is recovered therein. The condensed phthalic anhydride contains less than 1% of maleic anhydride, and has a purity of better than 95%.

Although preferred embodiments of the invention have been described with particular reference to the fractional condensation of phthalic anhydride it should be understood that they may be used for other purposes. Thus, for example, gases obtained by the catalytic oxidation of benzene with dry air may be passed through the positively cooled condensers, using cooling oil entering at about 45–55° C., whereby maleic anhydride of good purity is obtained. It is evident, therefore, that the invention in its broader aspects is not limited to the specific materials hereinbefore described, but that variations and substitutions may be resorted to within the scope of the appended claims.

What I claim is:

1. A method for the fractional condensation of phthalic anhydride from a gas mixture containing vapors of phthalic anhydride and maleic anhydride which comprises passing said gases at a temperature of approximately 135° C. into a chamber, maintaining the gas mixture within said chamber at a temperature between about 132° C. and about 80–90° C. by indirect heat exchange with a confined stream of fluid within said chamber admitted at a temperature of about 50°–100° C. and thereby condensing in said chamber a phthalic anhydride of low maleic anhydride content in the form of light, fluffy and non-adherent particles which coalesce to form larger crystals that settle out from the gas stream as a porous mass.

2. A method according to claim 1 in which the condensation is continued until the chamber is substantially filled with said phthalic anhydride crystals after which a confined stream of fluid having a temperature above 132° C. is passed in indirect heat exchange with said crystals, whereby the phthalic anhydride is melted, and the molten phthalic anhydride is drained from said chamber.

3. A method of recovering a purified phthalic anhydride from hot converter product gases containing phthalic and maleic anhydride which comprises passing said hot converter product gases at about 135° C. into a chamber and lowering the temperature of the gases quickly below about 132° C. and maintaining the gas temperature above about 80–90° C. by passing a fluid having a temperature of 50°–100° C. through elements uniformly spaced internally of said chamber and thereby condensing phthalic anhydride from said gases in said chamber in the form of light, fluffy particles which do not adhere to the temperature regulating elements but which coalesce to form larger crystals that settle out from the gas stream as porous mass.

4. A method of separating and recovering phthalic and maleic anhydrides from hot converter product gases containing the same which comprises passing said hot converter product gases into a condensing chamber and maintaining the gases therein at the temperature of incipient condensation of phthalic anhydride but above the condensing temperature of maleic anhydride by passing a fluid at inlet temperature of 50–60° through elements spaced internally of said chamber said cooling fluid being in indirect heat exchanging relation with said gases, whereby a mass of relatively large crystals of phthalic anhydride containing less than 1% of maleic anhydride is formed in said chamber, continuing the passage of converter product gases through said chamber while maintaining substantially the same temperature conditions therein whereby the previously formed mass of phthalic anhydride crystals aids in filtering suspended solids from the gases, and meanwhile passing the resulting filtered gases from said chamber in contact with an aqueous liquid to recover maleic acid therefrom.

KURT F. PIETZSCH.

REFERENCES CITED

The following references are of record in the file of this patent:

UNITED STATES PATENTS

| Number | Name | Date |
| --- | --- | --- |
| 2,064,468 | Foster | Dec. 15, 1936 |
| 2,071,329 | Brown | Feb. 23, 1937 |
| 2,076,033 | Kniskern | Apr. 6, 1937 |
| 2,215,968 | Livingston | Sept. 24, 1940 |
| 2,219,333 | Rogers | Oct. 29, 1940 |
| 2,283,209 | Hull et al. | May 19, 1942 |